Patented Nov. 16, 1937

2,099,079

UNITED STATES PATENT OFFICE 2,099,079

PRODUCTION OF COARSELY CRYSTALLINE AMMONIUM SULPHATE

Carl Rumscheidt and Anton Strzyzewski, Leuna, Germany, assignors to I. G. Farbenindustrie Aktiengesellschaft, Frankfort - on - the - Main, Germany No Drawing. Application January 10, 1935, Serial No. 1,157. In Germany January 19, 1934

16 Claims. (Cl. 23—119)

The present invention relates to the production of coarsely crystalline ammonium sulphate.

In the preparation of ammonium sulphate, importance is frequently paid to coarse, long grains for storage and transport reasons. This requirement is satisfied by the ammonium sulphate which is prepared by the saturator operation in coke oven plants when care is taken not only to insure a thorough mixing of the saturator bath but also for a definite content of free sulphuric acid in the bath. Also in the preparation of so-called synthetic ammonium sulphate coarse-grained and long crystals can be obtained by maintaining certain conditions during the evaporation or cooling process of the sulphate solution or during the leading of the ammonia into the saturator. The main necessity is a content of free acid as in the case of the saturator operation in coke oven plants. Furthermore additions of salts of metals, as for example of aluminium, iron or chromium and additions of sulphonic acids of organic compounds have also been proposed for influencing the form of the sulphate grains.

The handling of the more or less strongly acid solutions in the said processes is inconvenient and expensive. In particular an apparatus stable to corrosion made of lead or special alloys is necessary, the provision and maintenance of which gives rise to great expense. In the case of ammonium sulphate solutions which have been obtained by the reaction of gypsum with ammonium carbonate, the excess of ammonium carbonate or the free ammonia must first be expelled or neutralized with sulphuric acid and this latter requires quite considerable amounts of sulphuric acid. Finally there is a danger that the sulphate obtained may have a content of free acid which exceeds the prescribed maximum so that the salt must be subjected to a special aftertreatment.

We have now found, contrary to expectation, that even when working in a non-acid medium it is possible to increase the size of the ammonium sulphate grains by means of certain additions. According to this invention the said difficulties are overcome by carrying out the crystallization of the ammonium sulphate in non-acid liquids and in the presence of dissolved compounds of chromium. Soluble salts of chromium or its soluble complex compounds are especially suitable. The said complex chromium compounds may be added as such or produced within the solution itself.

The desired effect is for the most part obtained even with quite small amounts of the additional chromium compounds. Additions of a few hundredths up to about one tenth of a per cent of chromium calculated with reference to the dissolved ammonium sulphate are usually sufficient.

The crystals obtained from solutions containing dissolved chromium compounds are of an elongated needle-like shape; if for example chromium sulphate be used, crystals may be produced which show a ratio of thickness to length equal to 1:4.

Sometimes it may be advantageous to add to the solution of ammonium sulphate containing dissolved chromium compounds further additions. By this expedient the crystal shape of the ammonium sulphate can be widely varied. For this purpose soluble salts of sodium, magnesium, manganese and zinc are especially suitable, preferably in the form of their chlorides, sulphates, nitrates or acetates; furthermore organic sulphonic acids may be used. They are required in amounts of at the most about five per cent calculated on the ammonium sulphate dissolved; in most cases a few tenths of a per cent will be sufficient.

If it be desired, for example, to obtain elongated, but strong crystal grains, the additional substance may be the complex chromic sulphate-sulphuric acid which is obtainable by evaporating a mixture of chromic sulphate and sulphuric acid, together with magnesium sulphate or sodium chloride.

It is preferable to work with solutions with a pH-value of about 8.0, but the hydrogen concentration of the solution is not restricted to this special value; it is merely necessary so to adjust it that the reaction of the solution is neutral or alkaline. The hydrogen concentration of the solutions controls itself within certain limits, because ammonia distils off during the evaporation.

The advantage offered by the process according to this invention thus resides not only in the fact that by working in alkaline or neutral liquids (i. e. while avoiding the otherwise necessary addition of free sulphuric acid) the technical difficulties encountered in the handling of the ammonium sulphate solution, especially during its evaporation, are overcome, but also in the fact that it is possible to influence the form of the crystals to a large extent by varying the additions. This is of considerable importance for the storage of ammonium sulphate, especially under the difficult conditions in faulty storage chambers or in tropical or sub-tropical climates. Finally the process according to this invention offers the advantage of being independent to a large extent of the evaporation and cooling conditions, which by reason of the apparatus at present in use are usually narrowly limited. Both normal and, in accordance with this invention, coarsely grained ammonium sulphate may be produced in the same apparatus.

The following examples will further illustrate the nature of this invention but the invention is not restricted to these examples. The parts are by weight.

*Example 1*

Complex chromic sulphate-sulphuric acid obtained by evaporating a solution of 1 mole of green chromic sulphate in 3 moles of concentrated sulphuric acid and heating the resulting green mass to 110° to 120° C. is added to 1000 parts of an ammoniacal solution of ammonium sulphate (pH value equal to 8.0) containing 43 per cent by weight of ammonium sulphate in an amount corresponding to 0.007 part of chromium. The solution is evaporated in a so-called simplex evaporator in which it is held in a cyclic motion through the zone of evaporation while simultaneously blowing in a little air and while continually supplying fresh solution containing the said additions at the rate at which it is evaporated. Sieve analysis of the salt separated from the resulting mash is given in the table below which also applies to the salts obtained according to the following examples.

*Example 2*

Ammonium sulphate solution is evaporated under the conditions specified in Example 1, but with further addition of 1.5 parts of sodium chloride.

*Example 3*

Ammonium sulphate solution is evaporated under the conditions specified in Example 1, but with further addition of 1.5 parts of sodium sulphate.

*Example 4*

Ammonium sulphate solution is evaporated under the conditions specified in Example 1, but with further addition of 1.5 parts of magnesium sulphate.

*Example 5*

Ammonium sulphate solution is evaported under the conditions specified in Example 1, but with further addition of 1.5 parts of manganese sulphate. Instead of manganese sulphate zinc sulphate may be used with the same result.

*Example 6*

Ammonium sulphate solution is evaporated under the conditions specified in Example 1, but with further addition of 1.5 parts of aniline disulphonic acid.

From the following table the sieve analysis of the products obtained according to the examples may be seen. The sieve analysis was carried out by first shaking a given sample of the product on a sieve of 1.02 mm. mesh, then shaking the portion which had passed the meshes, on a second sieve of 0.75 mm. mesh and measuring the amounts (in per cent by weight of the initial sample) left on each sieve and having passed the second sieve, respectively. In order to make evident the favorable effect of the additions, a seventh example has been inserted which shows the sieve analysis of an ammonium sulphate which has been produced in the same way but without any addition.

| Size of meshes of sieve | Amount (in per cent) left on the sieve: | | | | | | |
|---|---|---|---|---|---|---|---|
| | Example 1 | 2 | 3 | 4 | 5 | 6 | 7 |
| 1.02 millimeters | 53.5 | 69.0 | 77.1 | 65.9 | 72.9 | 70.2 | 54.0 |
| 0.75 millimeter | 36.8 | 28.1 | 21.7 | 34.0 | 17.9 | 21.5 | 29.9 |
| Less than 0.75 millimeter | 9.7 | 2.9 | 1.2 | 0.1 | 9.1 | 8.3 | 16.1 |

What we claim is:—

1. Process for the production of coarsely crystalline ammonium sulphate consisting in the crystallization of this salt from aqueous non-acid solutions containing soluble chromium compounds.

2. Process for the production of coarsely crystalline ammonium sulphate consisting in the crystallization of this salt from aqueous non-acid solutions containing soluble chromium compounds in an amount not exceeding about 0.1 per cent chromium referred to the dissolved ammonium sulphate.

3. Process for the production of coarsely crystalline ammonium sulphate consisting in the crystallization of this salt from aqueous non-acid solutions containing soluble chromium salts in an amount not exceeding about 0.1 per cent chromium referred to the dissolved ammonium sulphate.

4. Process for the production of coarsely crystalline ammonium sulphate consisting in the crystallization of this salt from aqueous non-acid solutions containing soluble complex chromium salts in an amount not exceeding about 0.1 per cent chromium referred to the dissolved ammonium sulphate.

5. Process for the production of coarsely crystalline ammonium sulphate consisting in the crystallization of this salt from aqueous non-acid solutions containing soluble complex chromic sulphate-sulphuric acid in an amount not exceeding about 0.1 per cent chromium referred to the dissolved ammonium sulphate.

6. Process for the production of coarsely crystalline ammonium sulphate consisting in the crystallization of this salt from aqueous non-acid solutions containing soluble chromium compounds at a pH-value of about 8.0.

7. Process for the production of coarsely crystalline ammonium sulphate consisting in the crystallization of this salt from aqueous non-acid solutions containing soluble complex chromic sulphate-sulphuric acid in an amount not exceeding about 0.1 per cent chromium referred to the dissolved ammonium sulphate at a pH-value of about 8.0.

8. Process for the production of coarsely crystalline ammonium sulphate consisting in the crystallization of this salt from aqueous non-acid solutions containing soluble chromium compounds and at least one substance selected from the group consisting of the chlorides, sulphates and nitrates of sodium and magnesium.

9. Process for the production of coarsely crystalline ammonium sulphate consisting in the crystallization of this salt from aqueous non-acid solutions containing soluble chromium compounds and at least one substance selected from the group consisting of the chlorides, sulphates and nitrates of sodium and magnesium, in an amount not exceeding about 5 per cent referred to the dissolved ammonium sulphate.

10. Process for the production of coarsely crystalline ammonium sulphate consisting in the crystallization of this salt from aqueous non-acid solutions containing soluble chromium salts in an amount not exceeding about 0.1 per cent chromium referred to the dissolved ammonium sulphate and at least one substance selected from the group consisting of the chlorides, sulphates and nitrates of sodium and magnesium, in an amount not exceeding about 5 per cent referred to the dissolved ammonium sulphate.

11. Process for the production of coarsely crystalline ammonium sulphate consisting in the crystallization of this salt from aqueous non-acid solutions containing soluble complex chromium salts in an amount not exceeding about 0.1 per cent chromium referred to the dissolved ammonium sulphate and at least one substance selected from the group consisting of the chlorides, sulphates and nitrates of sodium and magnesium, in an amount not exceeding about 5 per cent referred to the dissolved ammonium sulphate.

12. Process for the production of coarsely crystalline ammonium sulphate consisting in the crystallization of this salt from aqueous non-acid solutions containing soluble complex chromic sulphate-sulphuric acid in an amount not exceeding about 0.1 per cent chromium referred to the dissolved ammonium sulphate and at least one substance selected from the group consisting of the chlorides, sulphates and nitrates of sodium and magnesium, in an amount not exceeding about 5 per cent referred to the dissolved ammonium sulphate.

13. Process for the production of coarsely crystalline ammonium sulphate consisting in the crystallization of this salt from aqueous non-acid solutions containing soluble complex chromic sulphate-sulphuric acid in an amount not exceeding about 0.1 per cent chromium referred to the dissolved ammonium sulphate and sodium chloride in an amount not exceeding about 5 per cent referred to the dissolved ammonium sulphate.

14. Process for the production of coarsely crystalline ammonium sulphate consisting in the crystallization of this salt from aqueous non-acid solutions containing soluble complex chromic sulphate-sulphuric acid in an amount not exceeding about 0.1 per cent chromium referred to the dissolved ammonium sulphate and sodium chloride in an amount not exceeding about 5 per cent referred to the dissolved ammonium sulphate at a pH-value of about 8.0.

15. Process for the production of coarsely crystalline ammonium sulphate consisting in the crystallization of this salt from aqueous non-acid solutions containing soluble complex chromic sulphate-sulphuric acid in an amount not exceeding about 0.1 per cent chromium referred to the dissolved ammonium sulphate and magnesium sulphate in an amount not exceeding about 5 per cent referred to the dissolved ammonium sulphate.

16. Process for the production of coarsely crystalline ammonium sulphate consisting in the crystallization of this salt from aqueous non-acid solutions containing soluble complex chromic sulphate-sulphuric acid in an amount not exceeding about 0.1 per cent chromium referred to the dissolved ammonium sulphate and magnesium sulphate in an amount not exceeding about 5 per cent referred to the dissolved ammonium sulphate at a pH-value of about 8.0.

CARL RUMSCHEIDT.
ANTON STRZYZEWSKI.